United States Patent
Fortier, Jr. et al.

[11] Patent Number: 6,131,861
[45] Date of Patent: Oct. 17, 2000

[54] BAG HOLDER

[76] Inventors: Gabriel A. Fortier, Jr.; Kay D. Fortier, both of 201 N. Pellerin St., Jeanerette, La. 70544

[21] Appl. No.: 09/149,500

[22] Filed: Sep. 8, 1998

[51] Int. Cl.[7] .................................................. A63B 55/08
[52] U.S. Cl. ................................ 248/98; 248/95; 248/97; 248/100
[58] Field of Search .............................. 248/95, 97, 98, 248/99, 100, 101; 220/495.07, 908.1

[56] References Cited

U.S. PATENT DOCUMENTS

| 754,580 | 3/1904 | Madden et al. ........................... 248/98 |
| 3,893,699 | 7/1975 | Morris ...................................... 248/98 |
| 4,202,521 | 5/1980 | Harding ................................... 248/98 |
| 4,358,083 | 11/1982 | Haubrich ................................ 248/100 |
| 4,708,307 | 11/1987 | Daigle ..................................... 248/97 |
| 4,955,505 | 9/1990 | Battaglia ............................. 220/908.1 |
| 5,069,405 | 12/1991 | Keating .................................... 248/98 |
| 5,139,219 | 8/1992 | Navarro ................................... 248/97 |
| 5,193,770 | 3/1993 | Kildare ..................................... 248/97 |
| 5,195,765 | 3/1993 | Lacey, Jr. ............................. 280/47.26 |
| 5,222,704 | 6/1993 | Light ...................................... 248/100 |
| 5,263,672 | 11/1993 | He ............................................ 248/97 |
| 5,397,085 | 3/1995 | Spagnolo ................................. 248/97 |
| 5,427,340 | 6/1995 | Stromsmoe et al. ..................... 248/97 |
| 5,445,398 | 8/1995 | Pierce ....................................... 248/98 |
| 5,456,431 | 10/1995 | Ilnisky .................................... 248/98 |
| 5,478,152 | 12/1995 | Bogle ....................................... 383/33 |
| 5,593,117 | 1/1997 | Alexander, III .......................... 248/99 |
| 5,597,145 | 1/1997 | Meyers et al. ........................... 248/97 |

FOREIGN PATENT DOCUMENTS

| 186302 | 2/1960 | Sweden .................................. 248/99 |
| 1148211 | 4/1969 | United Kingdom .................. 211/350 |

*Primary Examiner*—Anita M. King
*Assistant Examiner*—Kimberly Wood
*Attorney, Agent, or Firm*—Joseph N. Breaux

[57] ABSTRACT

A bag holder comprising an adjustable frame assembly to maintain a top end of a lawn/leaf bag in an open position. A supporting structure supports the adjustable frame assembly horizontally above the ground, so that the lawn/leaf bag will extend downwardly in a vertical position to allow a person to easily insert debris through the top end of the lawn/leaf bag.

1 Claim, 2 Drawing Sheets

BAG HOLDER

TECHNICAL FIELD

The present invention relates to bag holding devices and more particularly to a bag holder. The bag holder is for holding the top end of a lawn/leaf bag in an open position while supporting the bottom end of the lawn/leaf bag in a wheeled supporting structure. The wheeled supporting structure includes an axle having a pair of rotatable wheels mounted thereon and a base plate is mounted thereto to support bottom end of the lawn/leaf bag off of the ground. An adjustable collar is provided for locking the top end of the lawn/leaf bag about another adjustable collar on the supporting structure.

BACKGROUND ART

Numerous bag holding devices have been provided in prior art. For example, U.S. Pat. No. 5,069,405 to Keating; 5,139,219 to Navarro; 5,193,770 to Kildare; 5,195,765 to Lacey, Jr.; 5,222,704 to Light; 5,263,672 to He; 5,397,085 to Spangnolo; 5,427,340 to Stomsmoe et al.; 5,456,431 Ilnisky; 5,478,152 to Bogle; 5,593,117 Alexander, III and 5,597,145 to Meyers et al. all are illustrative of such prior art. While these units may be suitable for the particular purpose to which they address, they would not be as suitable for the purposes of the present invention as heretofore described.

The Keating U.S. Pat. No. 5,069,405 discloses a mobile leaf bag loading fixture. A mobile leaf bag loading fixture is provided which includes an elongated back, forwardly extending bottom, and bag-supporting hoop. The fixture is equipped with strategically located wheels, permitting the fixture to be placed directly upon a support surface with the wheels being rendered nonoperative, so as to facilitate bag loading. When loading operations are completed, the fixture may be raised and wheeled away. Preferably, the hoop consists of interfitted, adjustable sections permitting alteration of the effective size of the hoop. In addition, the hoop is advantageously oriented at an acute angle relative to back, to further ease loading operations.

The Navarro U.S. Pat. No. 5,139,219 discloses a bag holder. The present invention is a bag holder for plastic trash bags for use outdoors, such as lawns, gardens, and the like. A standard is provided with a pointed lower end, and a foot peg for pushing the end of the standard into the ground. An adjustable clamp assembly is disposed on the standard and may be moved along the standard to a desired point and locked. An elongate flat spring strip of metal or plastic having a length greater than the circumference of the largest trash bag to be used is attached to the clamp assembly. The spring strip is bent into a circle and the opening of the bag is drawn over the spring strip which is released to hold the bag.

The Kildare U.S. Pat. No. 5,193,770 discloses a bag holder. A relatively simple, collapsible garbage bag holder of the type for use outdoors includes an annular frame with an outer peripheral groove therein for receiving a split ring, which is used to releasably retain the top end of a garbage bag on the frame, legs releasably connected to the frame for holding the latter above the ground, a pair of handles on the free ends of the split ring for rotating the ring around a hinge on the opposite side of the frame between an open bag receiving position and a closed position, and a triangular latching lever rotatably mounted on one handle with an arcuate slot therein for slidably receiving the other handle, whereby when the lever is rotated the handles are drawn together to tighten the ring against the bag and into the groove.

The Lacey, Jr. U.S. Pat. No. 5,195,765 discloses a paper sack holding dolly with top entry guide and bag top to guide shank holding strap. A paper sack carrying wheeled dolly is provided having a bottom platform supporting the bottom of a biodegradable paper sack such as is now required by some municipalities in their recycling programs. The upright frame of the dolly has a rearwardly extended top handle portion and mounts a top entry guide extended forwardly therefrom vertically aligned with the bottom platform with a bottom shank sized to fit within the top of the paper sack. A retainer strap having opposite ends fastened to opposite sides of the top of the frame has resiliently deflectable convex portions cam action latch tightened on opposite sides and the front of a bag at the top against the bag entry shank of the top entry guide.

The Light U.S. Pat. No. 5,222,704 discloses a bag support device for supporting a bag within a trash container. A bag support device for supporting a plastic bag within a trash container, the device including a pair of elongate clamp arms structured and disposed to apply a clamping force on opposite sides of a wall of the container, and a hook member extending upwardly from a lower end of one of the clamp arms within the container, the hook member being structured and disposed to support a portion of a handle of a plastic bag placed within the container, wherein at least two of the support devices attached to opposite side walls of the container support opposite handles of the bag such that an open ended thereof is held open such that items may be deposited therein.

The He U.S. Pat. No. 5,263,672 discloses an economical and collapsible waste basket. A waste basket comprises a pair of elongate lateral members having loop type handles formed on respective upper edges thereof, a pair of flaps with snap fitting projections formed on respective lateral edges thereof, and a pair of roughly U-shaped wire supports. The snap fitting projections on the flaps engage pivot holes on corresponding ends of respective lateral members to interconnect the two, with the terminal ends of the wire supports being frictionally inserted into corresponding receiving holes on the respective lateral members to complete the assembly of the waste basket. A waste bag which can be an ordinary shopping bag is then disposed within the waste basket with the handling loops of the shopping bag wrapped over the handles and the flaps, which are swivelably secured, can be swiveled around to rest within the bag.

The Spangnolo U.S. Pat. No. 5,397,085 discloses a sandbag fitting aid. A new and improved sandbag filling aid for supporting a sandbag in an upright position and providing a fill-chute to enable a single person to rapidly and efficiently fill sandbags during emergency situations, the sandbag filling aid comprising an upright tubular frame structure having left and right parallel support columns, a first horizontal hoop member, a second horizontal hoop member, whereby a sandbag within the first hoop may be clamped in place by pivoting the second hoop downwardly until it contacts the sandbag, and an arcuate fill-chute member extending upwardly and slightly outwardly from the second hoop member such that when the second hoop member is positioned for clamping a sandbag the chute will catch and direct hastily shoveled or thrown sand into the mouth of the sandbag.

The Stromsmoe et al. U.S. Pat. No. 5,427,340 discloses a bag holder. There is described in an improved apparatus for holding a liner or bag in an open condition, comprising a ground-engaging base and opposed frames adapted to extend upwardly from the base for supporting the liner therefrom, the frames being sufficiently spaced apart that attachment of the liner causes blasing of liner engaging portions of the frames against the liner for tensioning it into an open condition.

The Ilnisky U.S. Pat. No. 5,456,431 discloses an apparatus for supporting a trash bag. An apparatus for supporting trash bags that prevents the trash bag from contacting the ground during transport. The apparatus includes a main vertically oriented member having a carrying assembly at its top end and a wheeled supporting base assembly at its bottom end. The carrying assembly holds and maintains the open end of the trash bag. The base assembly includes a horizontally oriented plate that is vertically aligned with the carrying assembly to prevent the closed end of the bag from contacting the ground.

The Bogle U.S. Pat. No. 5,478,152 discloses a locking system for holding open a plastic film bag. A locking system for releasably holding open the opening of a plastic film bag, composed generally of a first locking element extending from the external surface of the plastic film bag adjacent the opening thereof and a second locking element extending from a shape defining structure. The first locking element lockably mates with the second locking element in a male-female fashion either by pressing them mutually together or by sliding one into the other. The shape defining structure may be a ring member of a sidewall of a trash receptacle or of a removable lid therefor, or some other structure, such as a free standing ring member which may or may not be of circular shape. The first and second locking elements may be configured in a number of different forms in order to accomplish the aforesaid mutual interlocking function. For example, a T-shaped tongue element extending from the exterior sidewall of the plastic film bag and a female groove having opposing bosses separated by a slot provided on the shape defining structure, wherein the T-shaped tongue element is slid into or out of the female groove in order to selectively hold open the plastic film bag. As another example, the first and second elements may be in the form of a bulbous male rib and female socket arrangement, wherein alignment guides may be optionally provided to assist aligning of the first and second elements.

The Alexander, III U.S. Pat. No. 5,593,117 discloses a leaf and lawn debris collecting apparatus. A lawn and garden debris collecting apparatus comprising primarily of a two component funneled receiver and a permanent, reusable bag or a conventional trash bag. The mouth of the bag is held open by the apparatus therebetween the forward component and the rear component with a flexible strap joining together the two components. The funneled receiver is normally placed on the ground with the bag attached thereto. Leaves from a lawn or the like is then raked into the funneled receiver and channeled therethrough into the bag. A cut out hand hold is further included to seat the leaves and debris as needed as well as strategically repositioning and to allow the apparatus to be hung vertically from a protruding nail on a wall or the like.

The Meyers et al. U.S. Pat. No. 5,597,145 discloses an individual sandbagging accessory apparatus. An individual sandbagging necessary apparatus which includes a principal sandbag support portion, a plurality of removable leg members attachable to the principle sandbag support portion, for positioning the support portion above the ground; clip members for securing the upper end of a sandbag through the support system, so that once secured, there is defined an upper bag opening for delivering sand into; and a plurality of ports in the walls of the principal support portion for allowing the legs to be slidably engaged through the support portion, for defining a compact apparatus which could be secured to a backpack and easily transported.

GENERAL SUMMARY DISCUSSION OF INVENTION

The bag holder consists of a supporting structure having a plurality of legs. A base plate is mounted near lower end of each leg, while the adjoining rear legs feature an axle for two wheels. Above the wheel axle is a spring-biased dispenser rod to support a roll of lawn/leaf bags. The top of the legs are connected to a first adjustable collar linked by opposing spring-loaded clamps. A handle is mounted to the first adjustable collar on the axle side of the supporting structure. Surrounding the first adjustable collar is a second adjustable collar featuring the same type of spring-loaded clamps with a cut out fitting for the handle.

A primary object of the present invention is to provide a bag holder that will overcome the shortcomings of the prior art devices.

Another object is to provide a bag holder that is a redesigned lawn/leaf bag holding apparatus to make yard work clean up a lot faster and more enjoyable.

An additional object is to provide a bag holder that features a supporting structure for an adjustable frame assembly holding a top end of a lawn/leaf bag in an open position and a spring-biased dispenser rod to support a roll of lawn/leaf bags.

A further object is to provide a bag holder that is simple and easy to use.

A still further object is to provide a bag holder that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

Similar reference characters denote corresponding features consistently throughout the attached drawings.

EXEMPLARY MODE FOR CARRYING OUT THE INVENTION

Figure 1:
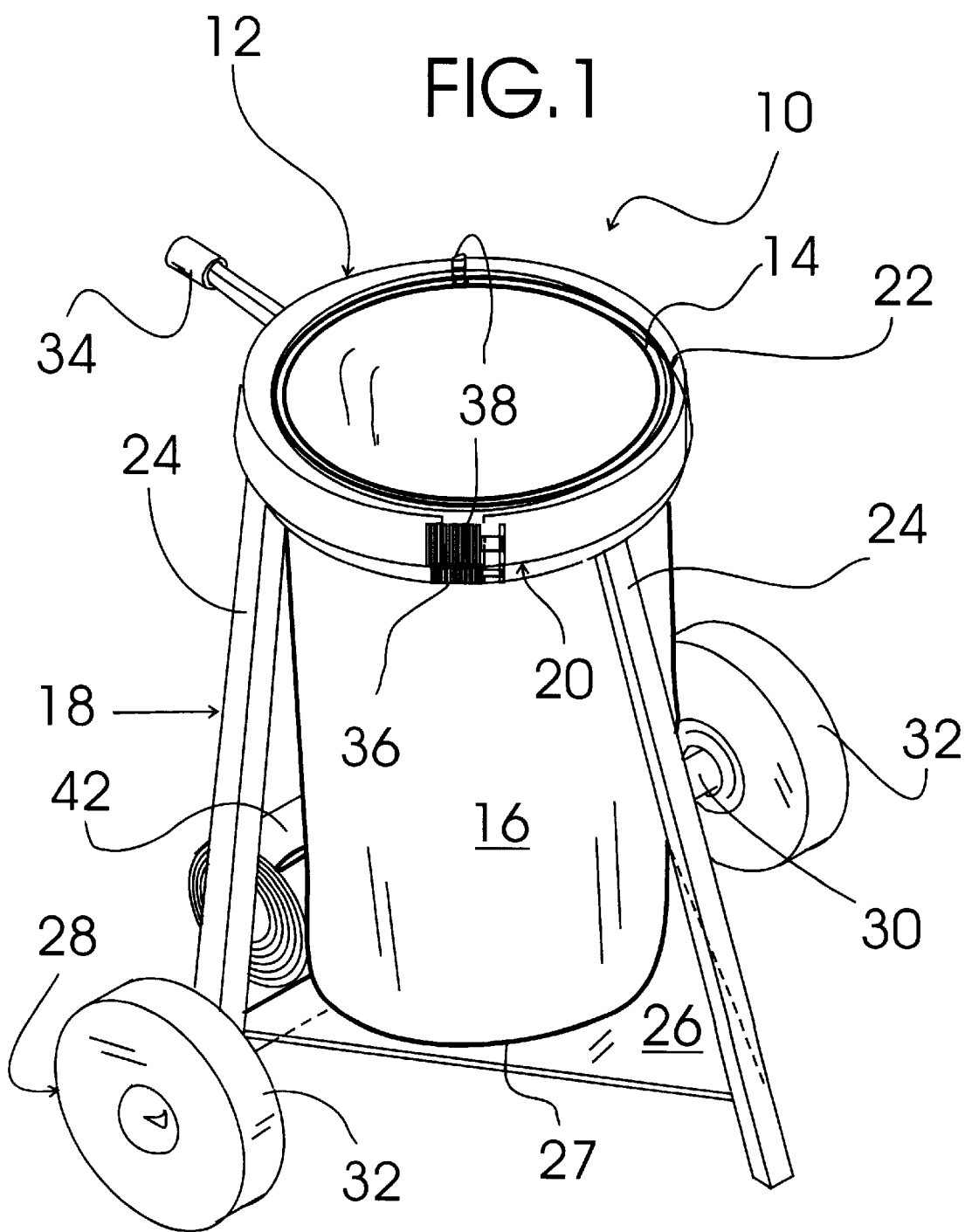
FIG. 1 is a perspective view of the present invention with a lawn/leaf bag mounted thereon.
Figure 2:
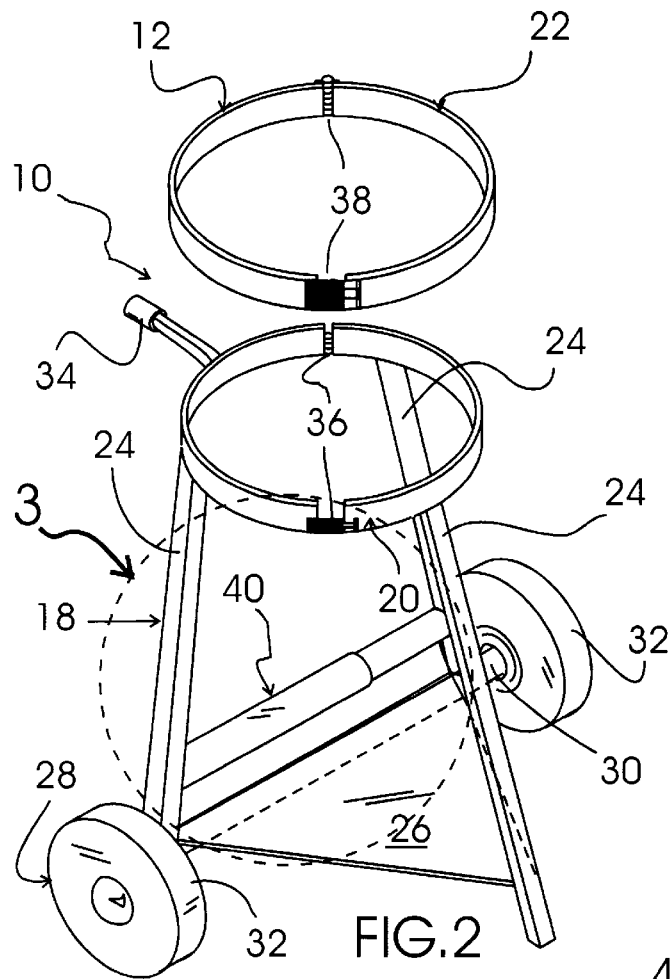
FIG. 2 is a perspective view similar to FIG. 1, with the lawn/leaf bag removed and the second adjustable collar exploded therefrom.
Figure 3:
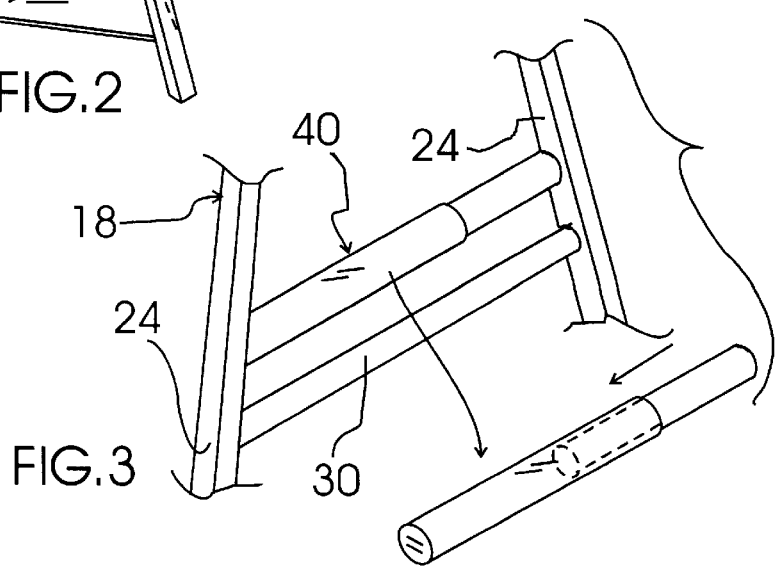
FIG. 3 is an enlarged perspective view of an area as indicated by arrow 3 in FIG. 2, showing the spring-biased dispenser rod for the roll of lawn/leaf bags in greater detail.

Turning now descriptively to the drawings, in which similar reference characters denote similar elements throughout the several views, FIGS. 1 through FIG. 3 illustrate the various features of the present invention being a bag holder 10 comprising an adjustable frame assembly 12 to maintain a top end 14 of a lawn/leaf bag 16 in an open position. A supporting structure 18 supports adjustable frame assembly 12 horizontally above the ground, so that the lawn/leaf bag 16 will extend downwardly in a vertical position to allow a person to easily insert debris through the top end 14 of the lawn/leaf bag 16.

Adjustable frame assembly 12 includes a first adjustable collar 20 mounted an upper end of supporting structure 18, with the top end 14 of the lawn/leaf bag 16 folded over first adjustable collar 20. A second adjustable collar 22 fits over the folded over top end 14 of the lawn/leaf bag 16 on first adjustable collar 20. Supporting structure 18 consists of a plurality of legs 24 spaced apart and affixed at upper ends to first adjustable collar 20. A base plate 26 horizontally extends between lower ends of legs 24 to support bottom end 27 of the lawn/leaf bag 16 off of the ground.

The bag holder 10 further includes a facility 28 for transporting supporting structure 18 to different locations. Transporting facility 28 consists of an axle 30 extending horizontally through lower ends of two adjacent rear legs 24, a pair of wheels 32, in which each wheel 32 is rotatably mounted on an end of axle 30 and a handle 34 horizontally mounted to first adjustable collar 20 above wheels 32. A person can grasp handle 34 tilt rearwardly and push forwardly to allow wheels 32 to roll upon the ground.

First adjustable collar 20 includes opposing spring-loaded clamps 36 to change and lock the size of first adjustable collar 20, so as to match up with size of the top end 14 of the lawn/leaf bag 16. Second adjustable collar 22 also includes opposing spring-loaded clamps 38 to change and lock the size of second adjustable collar 22, so as to match up with the size of first adjustable collar 20 and the size of the top end 14 of the lawn/leaf bag 16. A spring-biased dispenser rod 40 is removably mounted between two of adjacent legs 24 above axle 30 with rotatable wheels 32, so that dispenser rod 40 can support a roll 42 of lawn/leaf bag 16 thereon as shown in FIG. 1.

It can be seen from the preceding description that in use, a person folds the top end 14 of lawn/leaf bag 16 around first adjustable collar 20 attached to legs 24. Should the person need to increase or decrease the diameter of first adjustable collar 20 to fit the selected lawn/leaf bag size, the opposing spring-loaded clamps 36 are adjusted to create the appropriate size, allowing the legs 24 to bow or flex relative to the adjustment. Next, the person places the second adjustable collar 22 over the first adjustable collar 20, adjusting its size in a manner similar to the first adjustable collar 20. Finally, the person may mount a roll 42 of lawn/leaf bags 16 to the bag holder 10 by removing the dispenser rod 40, inserting it though the roll 42 of lawn/leaf bags 16, then replacing the dispenser rod 40. During use, the person may move the bag holder 10 by grasping the handle 34 on the axle side of the legs 24, tilting the device backward, and pushing the device forward. Use of the bag holder 10 will provide a practical and easy to use method of allowing a person to easily place lawn and tree debris in a large lawn/leaf bag 16 regardless of its dimensions.

It is noted that the embodiment of the bag holder described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A bag holder comprising:

an adjustable frame assembly to maintain a top end of a lawn/leaf bag in an open position; and means for supporting said adjustable frame assembly horizontally above the ground, so that the lawn/leaf bag will extend downwardly in a vertical position to allow a person to easily insert debris through the top end of the lawn/leaf bag, said means for supporting said adjustable frame including three legs spaced apart and affixed at upper ends to said first size adjustable collar and a base plate horizontally extending between lower ends of said legs to support bottom end of the lawn/leaf bag off the ground;

said adjustable frame assembly including a first size adjustable collar mounted on an upper end of said means for supporting, such that the top end of the lawn/leaf bag is foldable over said first adjustable collar and a second size adjustable collar fittable over the top end of the leaf/lawn bag when it is folded over on said first adjustable collar;

said bag holder further including a spring-biased dispenser rod removably mounted between two adjacent rear legs of said three legs above an axle with a rotatable wheels, so that said dispenser rod can support a roll of lawn/leaf bags thereon.

* * * * *